United States Patent Office 3,118,469
Patented Jan. 21, 1964

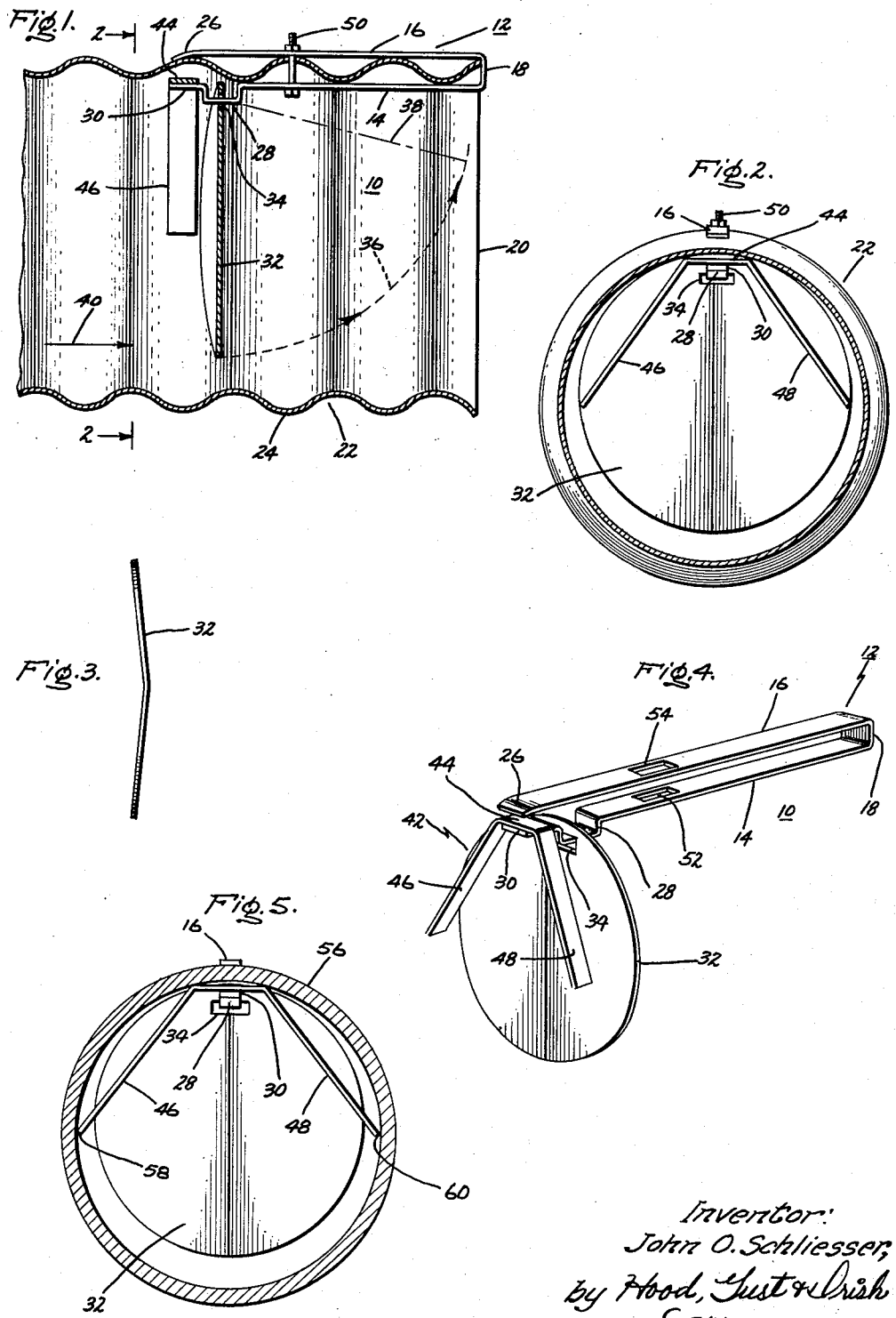

3,118,469
ANIMAL GUARD FOR TILE DRAIN PIPE
John O. Schliesser, Box 103, Hicksville, Ohio
Filed Dec. 1, 1961, Ser. No. 156,367
6 Claims. (Cl. 137—527.8)

This invention relates generally to drain pipe or tile of the type employed for draining fields, and more particularly to a device for preventing animals entering the outlet of the pipe while nevertheless permitting the free flow of water therein.

Drain pipe or tile commonly has its outlet end discharging into a stream and thus is readily accessible for entrance by animals such as muskrats, raccoons, etc. Such animals may travel considerable distances down the pipe and frequently become caught or otherwise unable to extricate themselves and die, thus clogging the pipe. In the past, it frequently has been necessary to dig up substantial lengths of drain pipe or tile in order to find the section in which a dead animal is lodged.

Numerous arrangements have been proposed for preventing the entrance of animals into drain pipe or tile, however, to the best of applicant's knowledge, such devices have either been too difficult and costly to install or have not performed satisfactorily. Arrangements incorporating screens extending across the discharge end of the pipe, while preventing the entrance of animals, nevertheless catch debris flowing down the pipe, eventually restricting the flow therein. Some arrangements employing slats or gates could not be readily installed in existing sections of drain pipe while others could be opened by certain animals, such as raccoons.

It is therefore desirable to provide a device for preventing the entrance of animals into drain pipe or tile while nevertheless permitting the free flow of water and debris therein, such device being characterized by its simplicity and low initial cost, ease of installation on existing drainpipe, either metallic or non-metallic, and the fact that it cannot be opened by animals.

It is accordingly an object of my invention to provide an improved animal stop for drain pipe.

Another object of my invention is to provide an improved animal stop for drain pipe characterized by its simplicity and low initial cost.

Another object of my invention is to provide an improved animal stop for drain pipe which may be readily installed on existing pipe, either metallic or non-metallic.

Yet another object of my invention is to provide an improved animal stop for drain pipe which cannot be opened by animals but which permits the free flow of water and debris in the pipe.

Further objects and advantages of my invention will become apparent by reference to the following description and the accompanying drawing, and the features of novelty which characterize my invention will be pointed out with particularity in the claims annexed to and forming a part of this specification.

My invention, in its broader aspects, provides an animal stop device for drain pipe comprising a generally U-shaped member having inner and outer legs connected by a bight portion and proportioned to be positioned over the end of a section of pipe with the inner and outer legs extending axially of the pipe and respectively engaging the inner and outer surfaces thereof. A baffle member is pivotally mounted on the inner leg and depends therefrom for pivotal movement in a direction toward the inner leg and bight portion, and means are provided on the inner leg for preventing movement of the baffle member in the opposite direction.

In the drawing:
FIG. 1 is a cross-sectional view of a section of corrugated steel culvert having my improved animal stop device assembled thereon;

FIG. 2 is a cross-sectional view taken along the line 2—2 of FIG. 1;

FIG. 3 is a top view of the baffle plate member of the previous figures;

FIG. 4 is a view in perspective showing the animal stop device of the previous figures disassembled from the pipe; and FIG. 5 is a cross-sectional view showing the assembly of the animal stop device of my invention on a section of non-metallic tile.

Referring now to FIGS. 1 through 4 of the drawing, my improved animal stop device, generally identified at 10, comprises a generally U-shaped metal strap member 12 having inner and outer leg portions 14 and 16 connected by a bight portion 18. Referring specifically to FIG. 1, the strap member 12 is shown positioned over the end 20 of a section 22 of corrugated steel culvert. It will be seen that the inner and outer legs 14 and 16 of the strap member 12 extend axially of the pipe and respectively engage the inner and outer surfaces of the corrugations 24, as shown, the bight portion 18 preferably engaging the ends 20 of the pipe. In the specific embodiment illustrated, the end 26 of the outer leg 16 may be formed inwardly to conform to one of the corrugations 24 as shown.

The inner leg 14 has a U-shaped portion 28 formed therein intermediate end 30 and bight portion 18 and extending radially inwardly toward the axis of the pipe 22. A generally circular baffle plate member 32 is provided formed of suitable relatively thin sheet metal. Baffle plate 32 has an elongated aperture or slot 34 formed therein adjacent its periphery. The U-shaped portion 28 of the inner leg 14 of strap member 12 extends through opening 34 in baffle plate member 32, thereby pivotally suspending baffle plate 32 in a normal position extending generally across the interior of the pipe 22 in a plane transverse to the axis thereof. It will be readily seen that by virtue of the pivotal connection of baffle plate member 32 to the U-shaped portion 28 of inner leg 14, the baffle plate member 32 may be pivoted in the direction of end 20 of pipe 22, as shown by the arrow 36. Baffle plate member 32 in its normal position extends generally across the interior of pipe 32, however, its diameter is somewhat less than the inside diameter of the pipe 20 in order to permit its pivotal movement in the direction 36. Further, in order to permit the baffle member to be pivoted upwardly to the position shown by the dashed line 38 to permit the flow of at least two-thirds the maximum quantity of water in the pipe and also to deflect water and debris toward the center of the pipe, the baffle member 32 has a shallow V-shaped cross-section in a plane parallel with leg 14 of strap member 12, as best seen in FIG. 3.

It will now be readily seen that the flow of water in pipe 22 in the direction shown by the arrow 40 toward the open end 20 will tend to cause the baffle plate member 32 to be pivoted in the direction 36, thereby to permit the flow of water out of the pipe. In accordance with an important feature of my invention, the U-shaped portion 28 of the inner leg 14 of the strap member 12 is spaced axially inwardly from bight portion 18 a sufficient distance so that the baffle plate member 32, when in its fully pivoted position 38, is nevertheless completely within the pipe 22, i.e., no portion extends forwardly beyond the end 20 of the pipe.

In order to prevent pivoting of the baffle plate member 32 in a direction opposite from direction 36 and thus to prevent the entrance of animals into the pipe section 22, a stop member 42 is provided having an intermediate portion 44 secured to the end 30 of inner leg 14 of the strap member 12, i.e., on the side of U-shaped portion 28 remote from bight portion 18; intermediate portion 44 may be secured to the end 30 in any suitable manner, as by welding. Depending from the ends of the intermediate portion 44 of stop member 42 are two respectively outwardly inclined leg portions 46 and 48. As best seen in FIG. 1, leg portions 46 and 48 are in closely spaced parallel relationship with the side of baffle plate member 32 remote from open end 20 of pipe 22 when the baffle plate is in its normal position, thus preventing pivotal movement of the baffle plate member 32 inwardly in a direction opposite from that shown by the arrow 36. As best seen in FIG. 2, the legs 46 and 48 of the stop member 42 are outwardly inclined toward diametrically opposite points on the interior surface of the pipe 22 and in the illustrated embodiment, the ends of legs 46 and 48 respectively terminate in general alignment with opposite points on the outer periphery of baffle plate member 32. In the embodiment illustrated in FIGS. 1 through 4 inclusive, the strap member 12 is held in assembled position on the pipe 22 by means of a suitable threaded fastener 50 extending through slots 52 and 54 in the inner and outer legs 14 and 16 of the strap member 12 and through a suitable opening formed in the wall of pipe 22, the slots 52 and 54 accommodating some degree of axial adjustment of the assembly. The provision of threaded fastener 50 thus not only prevents inadvertent removal of the assembly from the end of the pipe, but also prevents sagging or pulling down of the inner leg 14 of the strap member 12 which in turn would result in the baffle plate member 32 striking the bottom of the pipe.

Referring now to FIG. 5, in which like elements are indicated by like reference numerals, my improved animal stop is equally adapted for employment on non-metallic tile, such as clay or vitreous tile, a section 56 being shown in FIG. 5. Here, the legs 46 and 48 are initially spread apart so that their ends 58 and 60 are respectively transversely spaced apart by a distance slightly greater than the inside diameter of the pipe 56 when the animal stop assembly is initially positioned on the end of the pipe. Thus, when assembled, it will be seen that the ends 58 and 60 of the legs 46 and 48 of the stop member 42, resiliently engage the inner surface of the wall of the pipe section 56, thus preventing sagging or pulling down of the inner leg 14 of the strap member 12 and further preventing inadvertent removal of the assembly since any effort in the direction of removal tends to cause the corners of the ends 58 and 60 of legs 46 and 48 to dig into the surface of the inner wall of the pipe section 56. As will be seen in FIG. 5, it is desirable that the length of the legs 46 and 48 of the stop member 42 be such that ends 58 and 60 engage diametrically opposite points on the inner surface of tile, i.e., generally midway between the top and bottom of the inner surface.

In a specific example of my invention for 6-inch (inside diameter) corrugated steel culvert as shown in FIG. 1, plate 32 had a diameter of 5½ inches and was formed of 18-gauge steel, strap number 12 was formed of 9-gauge steel ¾ inch wide, leg 16 was 8½ inches long, plate 32 was suspended by U-shaped portion 28 seven inches from the bight portion 18, portion 44 of stop assembly 42 was 1¾ inches long, and legs 46 and 48 were 3¾ inches long, respectively, with their ends transversely spaced apart by 5¾ inches.

It is desirable that the baffle plate 32 be spaced inwardly from the end 20 of the pipe by approximately one-half the length of the animals primarily intended to be stopped thereby, most commonly raccoons and muskrats; the 7-inch inward spacing of the baffle plate 32 of the specific example is approximately half the length of an adult raccoon or muskrat. With this spacing, while the animal may be able to lift the plate with his nose or foot, in order to swing it upwardly a sufficient distance so that he can crawl under it, it is necessary for him to back up; however, with the aforementioned inward spacing of the baffle plate member, the animal's rear feet then will be out of the pipe and thus he will be unable to enter, even if it is possible for him to lift the plate member 32 slightly.

It will be observed that my improved animal stop device not only prevents animals from entering the pipe or tile, but further by swinging upwardly responsive to waterflow permits the pipe to clean itself of debris and trash. It will further be observed that my device is readily installed by unskilled labor over the end of existing pipe and drain tile installations. It will also be seen that once installed, the device cannot be easily or accidentally removed, as by children, and that its operation, once installed, is simple and virtually foolproof. It will finally be observed that my improved animal stop device is simply and inexpensively fabricated from readily available materials and without requiring skilled labor or special tooling.

While I have illustrated and described specific embodiments of my invention, further modifications and improvements will occur to those skilled in the art and I desire therefore in the appended claims to cover all modifications which do not depart from the spirit and scope of my invention.

What is claimed is:

1. An animal stop device for drain pipe comprising: a generally U-shaped strap member having inner and outer legs connected by a bight portion and proportioned to be positioned over the open end of a section of pipe with said inner and outer legs extending axially of the pipe and respectively engaging the inner and outer surfaces thereof; said inner leg having a generally U-shaped portion formed therein and depending therefrom at a point intermediate its end and said bight portion; a generally circular baffle plate member formed of relatively thin sheet material and having an opening formed therein adjacent its periphery, said U-shaped portion of said inner leg extending through said opening in said baffle plate and pivotally suspending the same therefrom for pivotal movement in a direction toward said inner leg and bight portion, the diameter of said baffle member being less than the spacing between said point and said bight portion; and a stop member for preventing movement of said baffle plate in the opposite direction, said stop member comprising an intermediate portion secured to said inner leg between said U-shaped portion and the end thereof and two respectively outwardly inclined legs depending from the ends of said intermediate portion and extending in close parallel relationship with said baffle plate member, said stop member legs being substantially shorter than the diameter of said baffle plate member and respectively extending at least to points adjacent the periphery thereof.

2. The combination of claim 1 wherein the distance from said U-shaped portion to said bight portion is greater than the distance from said opening in said baffle plate member to the diametrically opposite point on the periphery thereof.

3. The combination of a section of drain pipe having an open end downstream, and an animal stop device therefor comprising: a generally U-shaped strap member having inner and outer legs connected by a bight portion, said strap member being positioned over said open end of said pipe and with said inner and outer legs extending axially of the pipe and respectively engaging the inner and outer surfaces thereof and with said bight portion engaging said pipe end, said inner leg having a generally U-shaped portion formed therein intermediate its end and said bight portion and extending toward the axis of said pipe; a generally circular baffle plate member formed of relatively thin sheet material having an opening formed therein adjacent its periphery, said U-shaped portion extending through said opening in said baffle plate and pivotally suspending the same in said pipe for pivotal movement in a direction toward said pipe end from a normal position in a plane transverse to the pipe axis to a second position, said baffle plate member in said normal position thereof extending generally across the interior of said pipe thereby preventing entrance of animals therein, said baffle plate member in said second position thereof being entirely within said pipe, said baffle plate being moved toward said second position thereof responsive to water flow in said pipe; and a stop member having an intermediate portion secured to said inner leg between said U-shaped portion and the end thereof and two legs depending from the ends of said intermediate portion and extending in close parallel relationship with said baffle plate in the normal position thereof thereby preventing pivotal movement of said baffle plate in the opposite direction, said stop member legs being respectively inclined outwardly toward opposite points on the inner wall of said pipe.

4. The combination of claim 3 wherein said pipe is of the corrugated metal culvert type, wherein said stop member legs respectively terminate short of the interior wall of said pipe, wherein said strap member legs and pipe have aligned openings formed therein, and further comprising fastener means extending through said openings for securing said strap member on said pipe.

5. The combination of claim 3 wherein said pipe is a section of cast non-metallic tile, and wherein the ends of said stop member legs respectively engage the inner wall of said tile thereby preventing removal of said device from said tile and supporting said inner leg and baffle plate member.

6. An animal stop device for drain pipe comprising: a generally U-shaped mounting member having inner and outer legs connected by a bight portion and proportioned to be positioned over the open end of said pipe with said inner and outer legs extending axially of the pipe and respectively engaging the inner and outer surfaces thereof; a generally circular baffle member formed of relatively thin sheet material pivotally mounted adjacent its perimeter on said inner leg at a point spaced from said bight portion and being vertically suspended therefrom for pivotal movement in a direction toward said inner leg and bight portion, the diameter of said baffle member being less than the spacing between said point and said bight portion; and a stop member for preventing movement of said baffle member in the opposite direction, said stop member comprising an intermediate portion secured to said inner leg on the side of said plate member remote from said bight portion and a pair of legs respectively depending from the ends of said intermediate portion and inclined outwardly in a plane normal to said inner leg.

References Cited in the file of this patent
UNITED STATES PATENTS

| | | |
|---|---|---|
| 385,292 | Baltzley | June 26, 1888 |
| 999,305 | Gurnett | Aug. 1, 1911 |
| 1,670,519 | Pekrul | May 22, 1928 |
| 2,259,128 | Egan | Oct. 14, 1941 |
| 2,947,321 | Kovalcik | Aug. 2, 1960 |
| 2,961,836 | Hanson et al. | Nov. 29, 1960 |